No. 784,849. PATENTED MAR. 14, 1905.
A. L. FUQUA.
TRAP.
APPLICATION FILED JULY 21, 1904.
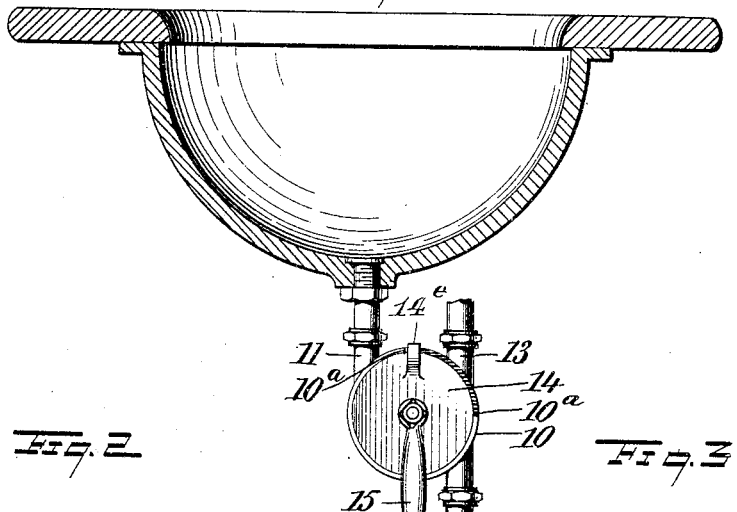
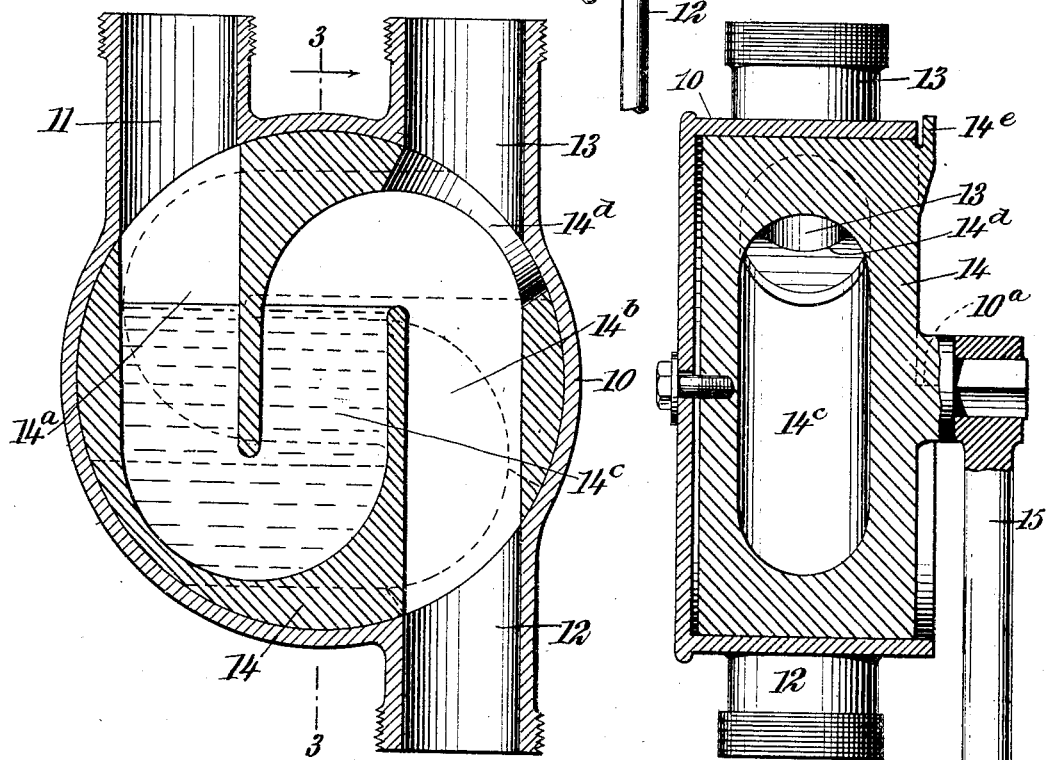
WITNESSES:
Joshua Bergstrom
Isaac B. Owens
INVENTOR
Arthur L. Fuqua
BY
Munn
ATTORNEYS No. 784,849. Patented March 14, 1905.

UNITED STATES PATENT OFFICE.

ARTHUR L. FUQUA, OF DURHAM, NORTH CAROLINA.

TRAP.

SPECIFICATION forming part of Letters Patent No. 784,849, dated March 14, 1905.

Application filed July 21, 1904. Serial No. 217,478.

*To all whom it may concern:*

Be it known that I, ARTHUR L. FUQUA, a citizen of the United States, and a resident of Durham, in the county of Durham and State of North Carolina, have invented a new and Improved Trap, of which the following is a full, clear, and exact description.

The invention relates to those traps which are employed in sewerage systems to seal a liquid-outlet against sewer-gases.

The present invention relates to a trap of such organization as will admit of its contents being drained whenever desired by an operation which, in addition to draining the trap, cuts off completely its connection with the sewer, so that the device may be used either as a trap or stop-cock. By this arrangement not only may the usual stopper or stop-cock of basins, tubs, and the like be dispensed with, but the trap may be emptied at will to prevent freezing of the water seal and without exposing the apartments to the danger and nuisance of gases escaping from the sewer.

Reference is had to the accompanying drawings, which illustrate as an example the preferred embodiment of my invention, in which drawings like numerals of reference indicate like parts in the several views, and in which—

Figure 1 is a sectional view of a basin, showing my invention applied thereto. Fig. 2 is an enlarged sectional view of the trap, showing by dotted lines its inactive adjustment; and Fig. 3 is a section on the line 3 3 of Fig. 2.

The various embodiments of the trap are not material to my invention. According to the example here given a casing 10 is provided, this casing being of general circular form and having an inlet-nipple 11 and an outlet or sewer nipple 12 and an air-vent nipple 13. These nipples 11, 12, and 13 are intended to be connected, as is usual in the plumbing art, the first with the basin or other vessel to be drained, the second with the sewer, and the third with the vent-pipe, which passes by suitable connections to the atmosphere. Within the casing 10 is the trap proper, 14, which has an S-shaped passage therein comprising the end limbs $14^a$ and $14^b$ and the middle limb $14^c$, as shown. The trap proper, 14, is also provided with an opening $14^d$, leading from the end limb $14^b$ to the periphery of the trap proper, 14. These various passages $14^a$, $14^b$, $14^c$, and $14^d$ are so disposed that when the trap is in the adjustment shown in Fig. 2 the passage $14^a$ will communicate with the inlet 11, the passage $14^b$ with the outlet 12, and the opening $14^d$ with the vent 13. This forms, therefore, an effective trap, the water seal lying in the lower parts of the passages $14^a$ and $14^c$ and the sewer connection 12 being placed in communication with the vent 13 by means of the passage $14^b$ and opening $14^d$, as shown. By turning the trap in the position indicated by broken lines in Fig. 2 the passage $14^a$ will be moved out of registry with the inlet 11 and the said inlet will be sealed. The opening $14^d$ will be drawn down into communication with the sewer connection 12, and the water seal in the trap will then be drained out into the sewer through said opening $14^d$. By this arrangement, therefore, I am enabled completely to drain the trap and also to cut off all communication between the sewer and the inlet 11. This enables the device to be employed either as a stop-cock or as means for draining the water seal from the trap to prevent the water from freezing or to meet any other condition that may arise.

As here shown, the trap proper, 14, is fitted with a lug $14^e$, which (see Fig. 2) is adapted to work between shoulders $10^a$, formed on the casing 10, so as to limit the movement of the trap 14. The trap is also provided with a handle 15 to facilitate its manual operation.

Various changes in the form, proportions, and minor details of my invention may be resorted to at will without departing from the spirit and scope thereof. Hence I consider myself entitled to all such variations as may lie within the terms of my claims.

Having thus described my invention, I claim as new and desire to secure by Letters Patent—

1. The combination of a casing having an inlet and outlet and a member movable therein, and having a passage forming a trap adapted when said member is in one position to register with the inlet and outlet openings of the casing, said member being movable from said position to close the inlet-opening of the casing, and the said member also having an opening adapted to register with the outlet when the member is in its second position to drain the liquid from said passage, the casing having a vent-opening adapted to register with the said opening in the movable member when the member is in its first position.

2. The combination of a casing having inlet and outlet openings and a vent-opening, and a trap proper mounted within the casing and having passages therein opening at the periphery of the trap and placing all of said openings of the casing in communication thereby forming a vented trap, said trap proper being mounted to turn in the casing to close the inlet of the casing and drain the trap.

3. The combination of a casing having an inlet and an outlet opening and a vent-opening, and a member within the casing and having a passage forming a trap and adapted to register with the inlet and outlet openings of the casing, the said member also having a vent-passage normally registering with the vent-opening in the casing, the said member being mounted to turn to close the inlet-opening in the casing and bring the vent-passage into registry with the outlet-opening of the casing and means for limiting the turning movement of said member.

4. The combination of a casing having inlet and outlet openings and a vent-opening, and a movable member arranged in the casing, said member having an S-shaped passage comprising end portions normally registering with the said inlet and outlet openings respectively, and a middle portion connecting the end portions, the said member also having an opening leading from one of the end portions of the passage to the periphery of the member and normally registering with the vent-opening in the casing.

5. The combination of a casing having inlet and outlet openings, and a movably-mounted member arranged in the casing, said member having an S-shaped passage formed therein and adapted to place said inlet and outlet openings in communication when the said member is in one position, the member also having an opening leading from the S-shaped passage intermediate its ends and adapted to register with the outlet-opening when the trap is in closed adjustment to drain the said S-shaped passage, the casing also having a vent-opening adapted to register with the said opening in the member when the trap is in open adjustment.

In testimony whereof I have signed my name to this specification in the presence of two subscribing witnesses.

ARTHUR L. FUQUA.

Witnesses:
J. W. TATUM,
A. M. KIRKLAND